(12) United States Patent
Sahin et al.

(10) Patent No.: US 6,935,167 B1
(45) Date of Patent: Aug. 30, 2005

(54) HARMONIC CANTILEVERS AND IMAGING METHODS FOR ATOMIC FORCE MICROSCOPY

(75) Inventors: Ozgur Sahin, Stanford, CA (US); Abdullah Atalar, Ankara (TR); Calvin F. Quate, Menlo Park, CA (US); Olav Solgaard, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 10/801,394

(22) Filed: Mar. 15, 2004

(51) Int. Cl.[7] .............................................. H01J 37/00
(52) U.S. Cl. ...................................................... 73/105
(58) Field of Search .......................... 73/105; 250/306, 250/307

(56) References Cited

U.S. PATENT DOCUMENTS

| | | | |
|---|---|---|---|
| 5,412,980 A | | 5/1995 | Elings et al. |
| 5,444,244 A | * | 8/1995 | Kirk et al. ................. 250/306 |
| 5,483,822 A | | 1/1996 | Albrecht et al. |
| 5,519,212 A | | 5/1996 | Elings et al. |
| 5,742,377 A | | 4/1998 | Minne et al. |
| 5,866,805 A | | 2/1999 | Han et al. |
| 5,883,705 A | | 3/1999 | Minne et al. |
| 5,924,845 A | * | 7/1999 | Bagley et al. .............. 416/145 |
| RE36,488 E | | 1/2000 | Elings et al. |
| 6,075,585 A | | 6/2000 | Minne et al. |
| 6,298,715 B1 | | 10/2001 | Thomson et al. |
| 6,349,591 B1 | * | 2/2002 | Fretigny et al. ............. 73/105 |
| 6,452,170 B1 | | 9/2002 | Zypman et al. |
| 6,578,410 B1 | | 6/2003 | Israelachvili |

OTHER PUBLICATIONS

Sahin et al., "Harmonic Cantilevers for Nanomechanical Sensing of Elastic Properties", Transducers '03, The 12th International Conference on Solid State Sensors, Actuators and Microsystems, Boston, Jun. 8-12, 2003, pp. 1124-1127.

Sahin et al., "Simulation of Higher Harmoncis Generation in Tapping-Mode Atomic Force Microscopy", Applied Physics Letters, vol. 79, No. 26, Dec. 24, 2001, pp. 4455-4457.

(Continued)

*Primary Examiner*—Robert Raevis
(74) *Attorney, Agent, or Firm*—Patent Law Group LLP; Carmen C. Cook (57) ABSTRACT

A harmonic cantilever for use in a tapping-mode atomic force microscope includes a cantilever arm and a probe tip. The cantilever arm has a shape selected to tune the fundamental resonance frequency or a resonance frequency of a selected higher order mode so that the fundamental and higher-order resonance frequencies have an integer ratio or near integer ratio. In one embodiment, the cantilever arm can be shaped to tune the fundamental resonance frequency. Alternately, the cantilever arm can include a geometric feature for tuning the resonance frequency of the fundamental mode or the selected higher order mode. An imaging method using the harmonic cantilever is disclosed whereby signals at the higher harmonics are measured to determine the material properties of a sample. In other embodiment, a cantilever includes a probe tip positioned at a location of minimum displacement of unwanted harmonics for suppressing signals associated with the unwanted harmonics.

32 Claims, 7 Drawing Sheets

OTHER PUBLICATIONS

Stark et al., "Tapping-Mode Atomic Force Microscopy and Phase-Imaging in Higher Elgenmodes", Applied Physics Letters, vol. 74, No. 22, May 31, 1999, pp. 3296-3298.

Hillenbrand et al., "Higher-Harmonics Generation in Tapping-Mode Atomic-Force Microscopy: Insights into the Tip-Sample Interaction", Applied Physics Letters, vol. 26, No. 23, Jun. 5, 2000, pp. 3478-3480.

Rabe et al., "Imaging and Measurement of Local Mechanical Material Properties by Atomic Force Acoustic Microscopy", Surface and Interface Analysis, 2002, vol. 33, pp. 65-70.

Stark et al., "Inverting Dynamic Force Microscopy: From Signals to Time-Resolved Interaction Forces", PNAS, Jun. 25, 2002, vol. 99, No. 13, pp. 8473-8478.

Stark et al., Higher Harmonics Imaging in Tapping-Mode Atomic-Force Microscopy, Review of Scientific Instruments, Dec. 2003, pp. 5111-5114, vol. 74, No. 12.

* cited by examiner

HARMONIC CANTILEVERS AND IMAGING METHODS FOR ATOMIC FORCE MICROSCOPY

FIELD OF THE INVENTION

The invention relates to cantilevers and imaging methods for use in atomic force microscopy and, in particular, to a scanning probe cantilever and imaging methods using the cantilever for imaging at higher harmonic modes of the excitation frequency in Tapping-Mode Atomic Force Microscopy.

DESCRIPTION OF THE RELATED ART

Atomic force microscope (AFM) has proven to be an exceptionally useful tool for mapping the topography of surfaces at the nanoscale. In an AFM, a flexible cantilever with an atomically sharp tip is brought to the vicinity of a sample surface and the deflections of the cantilever as a result of the attractive and repulsive forces between the tip and the sample are monitored while the cantilever is scanned across the surface.

Figure 1:
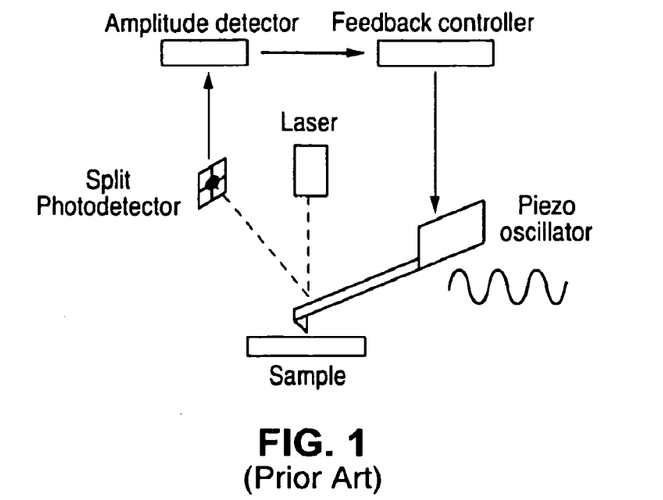
FIG. 1 is a generalized schematic diagram of a tapping-mode atomic force microscope.
Figure 2:
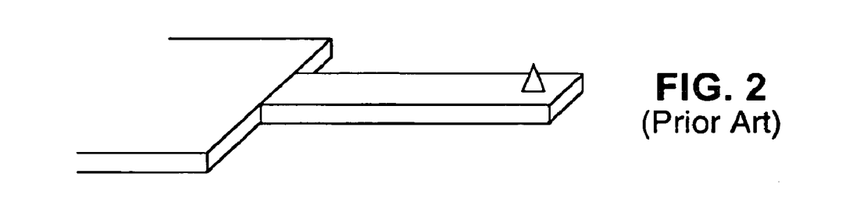
FIG. 2 is a generalized diagram of a conventional rectangular cantilever.

The earliest AFM imaging techniques required continuous contact between the tip and the sample, which resulted in frictional forces that damage both the tip and the sample. To overcome this issue, dynamic imaging techniques that do not require continuous tip-sample contact have been introduced. Among these, tapping-mode atomic force microscope (TM-AFM) has become the most widely used. FIG. 1 is a generalized schematic diagram of a tapping-mode atomic force microscope. FIG. 2 is a generalized diagram of a conventional rectangular cantilever which can be used in the atomic force microscope of FIG. 1. Typically, a cantilever includes a cantilever arm projecting from a base. A probe tip is positioned near the free end of the cantilever arm.

In the TM-AFM of FIG. 1, the cantilever is vibrated at a frequency close to one of its flexural resonances, typically the fundamental resonance frequency, in vicinity of the sample surface so that the tip makes intermittent contacts (tapping) with the surface once in every oscillation period. During the scan across the surface, the amplitude of vibration is maintained at a constant value through a feedback loop that adjusts the height of the cantilever base. Specifically, a light beam and a photodetector are used to measure the motion of the cantilever at the driving frequency. The feedback signal therefore reflects the topography of the surface. In FIG. 1, the feedback loop includes an optical lever detection system and a feedback controller.

Apart from high-resolution topography imaging, there has been a great deal of interest in using AFM as a tool to probe the hardness and elasticity of a sample at the nanoscale. Imaging of elastic properties enables detection of variations in chemical composition across the surface, characterization of thin films, and studies of nanomechanical structures in general. With an AFM, one can measure the contact stiffness between the nano-tip and the sample, which is a measure of the elasticity of the material in the vicinity of the contact. Among these techniques, the quasi-static techniques apply force to the sample and measure the indentation of the surface simultaneously, and the dynamic techniques either vibrate the cantilever or the sample and measure variations in the response to the cantilever which is affected by the elasticity of the sample. Although some of these techniques are sensitive to some extent, they require continuous tip-sample contact and therefore, they pose the same problems with the contact-mode imaging. Such techniques are not suitable for imaging soft samples like biological samples and polymers. The techniques that have been demonstrated also have not achieved sufficient sensitivity and simplicity for practical imaging.

In TM-AFM, it has been shown that the phase of the cantilever vibration is directly related to the energy dissipation during the tip-sample contact. The energy dissipation during the contact is a material dependant quantity and therefore, phase imaging in TM-AFM provides a good opportunity to image material variations across the sample surface. However, the mechanism of energy dissipation is not totally understood and it is known that several different phenomena are involved in the process of energy dissipation. Therefore, the ability of tapping-mode atomic force microscopy to extract material properties is limited.

Studies of cantilever dynamics in TM-AFM have shown that the vibration spectrum of tapping cantilevers exhibit peaks at integer multiples (higher harmonics) of the excitation frequency where the excitation frequency is generally the fundamental resonance frequency of the cantilevers. These harmonics are generated by the nonlinearity of the tip-sample interaction and carry information about the mechanical properties of the sample on a nanometer spatial scale. Imaging with these higher harmonics has been demonstrated and the result has shown good contrast based on material properties. Unfortunately, the vibration amplitudes of traditional AFM cantilevers at higher harmonics are too small for practical AFM imaging. Specifically, the signals at higher harmonics are 20–30 dB lower than the signal at the driving frequency of the cantilever. Thus, the resolution of imaging using the higher harmonics signals is severely limited.

Therefore, it is desirable to provide an apparatus or method which can enable non-destructive measurement of elasticity on both soft and hard samples using higher harmonic signals in a TM-AFM microscope.

SUMMARY OF THE INVENTION

According to one embodiment of the present invention, a cantilever for use in a tapping-mode atomic force microscope includes a cantilever arm having a fixed end and a free end and a probe tip projecting from the cantilever arm near the free end. The cantilever arm has a fundamental resonance frequency at a fundamental mode and at least one higher order resonance frequency and the cantilever arm has a shape selected to tune the fundamental resonance frequency or a resonance frequency of a selected higher order mode so that the resonance frequency of the selected higher order mode and the fundamental resonance frequency has an integer ratio.

In one embodiment, the resonance frequency of the selected higher order mode and the fundamental resonance frequency have an integer ratio or a ratio slightly below or slightly above an integer ratio, such as within 2% of the integer ratio. Thus, the integer ratio includes whole numbers and fractional numbers slightly greater than or less than the nearest whole numbers so that when the cantilever is driven at a driving frequency at or slightly below or slightly above the fundamental resonance frequency, the resonance frequency of the selected higher order mode is an integer multiple of the driving frequency.

In another embodiment, the free end of the cantilever arm has a second shape selected to tune the fundamental resonance frequency of the cantilever to a value that is integer divisible of the resonance frequency of the selected higher order mode.

In yet another embodiment, the cantilever arm includes a first geometric feature disposed at a predefined location of the cantilever arm. The first geometric feature operates to modify the mass of the cantilever arm at the predefined location to tune the fundamental resonance frequency or the resonance frequency of the selected higher order mode of the cantilever so that the fundamental resonance frequency and the resonance frequency of the selected higher order mode has an integer ratio.

In one embodiment, the geometric feature is a mass removal region operating to remove mass from the cantilever arm at a high mechanical bending stress region of the selected higher order mode. In another embodiment, the geometric feature is a mass addition region operating to add mass to the cantilever at a high mechanical bending stress region of the selected higher order mode.

According to another aspect of the preset invention, a method of operating a tapping-mode atomic force microscope for detecting material properties on the surface of a sample includes: providing a cantilever having a cantilever arm and a probe tip formed on a free end of the cantilever arm, the cantilever arm having a shape selected to tune the fundamental resonance frequency or a resonance frequency of a selected higher order mode so that the resonance frequency of the selected higher order mode and the fundamental resonance frequency has an integer ratio, vibrating the cantilever at or near the fundamental resonance frequency with a predetermined oscillation amplitude, bringing the cantilever to the vicinity of the sample, tapping the surface of the sample repeatedly using the probe tip, and detecting changes in the phase of the frequency of the selected higher order mode as the cantilever is deflected in response to features on the surface of the sample.

According to yet another aspect of the present invention, a cantilever for use in a tapping-mode atomic force microscope includes a cantilever arm having a fixed end and a free end and a probe tip projecting from the cantilever arm. The probe tip is positioned at a location of minimum displacement of a selected mode of the cantilever for suppressing the harmonics generated by the selected mode.

According to another aspect of the present invention, a method of operating a tapping-mode atomic force microscope for detecting material properties on the surface of a sample includes providing a cantilever having a cantilever arm and a probe tip formed on a free end of the cantilever arm, vibrating the cantilever at or near the fundamental resonance frequency with a predetermined oscillation amplitude, bringing the cantilever to the vicinity of the sample, measuring the amplitude of the cantilever vibrations at a selected higher order harmonic of the fundamental resonance frequency, and detecting an increase in the amplitude of the cantilever vibrations at the selected higher order harmonic to indicate that the probe tip of the cantilever has engaged the sample surface.

The present invention is better understood upon consideration of the detailed description below and the accompanying drawings.

BRIEF DESCRIPTION OF THE DRAWINGS

FIG. 3 includes FIG. 3(a) which illustrates the tip displacement with respect to sample surface (dashed line) in a typical TM-AFM and FIG. 3(b) which illustrates the tip-sample interaction forces.

FIG. 10, which includes

FIG. 12, including

DETAILED DESCRIPTION OF THE PREFERRED EMBODIMENTS

In accordance with the principles of the present invention, a harmonic cantilever has a higher order eigenmode that resonates at an integer multiple of the fundamental resonance frequency of the cantilever. The harmonic cantilever of the present invention enables sensing of nonlinear mechanical interactions between the atomically sharp tip at the free end of the cantilever and a surface with unknown mechanical properties in tapping-mode atomic force microscopy (TM-AFM). Specifically, the harmonic cantilever of the present invention enables TM-AFM imaging at higher harmonics by mechanically amplifying the higher eigenmode vibrations and thereby increasing the resolution of imaging at higher order modes. In one embodiment, the ratio of the fundamental resonance frequency and the resonance frequency of a higher eigenmode of the harmonic cantilever of the present invention is tuned to be an integer value or near integer value to enable amplification of the higher eigenmode vibrations.

The ratio of the fundamental resonance frequency and the resonance frequency of a higher eigenmode of the harmonic cantilever of the present invention can be tuned to an integer value by either tuning the fundamental resonance frequency to be an integer divisible of the resonance frequency of the selected higher order mode or tuning the resonance frequency of the selected higher order mode to be an integer multiple of the fundamental resonance frequency. In one embodiment, the fundamental resonance frequency or the resonance frequency of the selected higher order mode of the cantilever is tuned by introducing geometric features to specific locations of the cantilever arm. The geometric features operate to modify the effective spring constant and/or the effective mass of the cantilever, thereby modifying the resonance frequency of the desired mode (the fundamental mode or a higher order mode). In an alternate embodiment, the fundamental resonance frequency of the cantilever is tuned by selecting a specific shape for the cantilever arm.

In conventional cantilevers, the resonance frequencies of the higher order modes are located arbitrarily in the frequency domain. As a result, the higher order harmonics cannot excite the higher resonance frequencies efficiently. However, the harmonic cantilever of the present invention is configured so that the resonance frequency of a higher order mode is an integer multiple of the fundamental resonance frequency. Since the higher harmonics are located at integer multiples of the driving frequency that is at or near the fundamental resonance frequency, efficient resonant excitation can occur when the ratio of the frequencies of a higher order mode and fundamental mode is tuned to an integer value.

In operation, the cantilever is driven either at the fundamental resonance frequency or at a driving frequency slightly blow or slightly above the fundamental resonance frequency and still be within the resonance peak. Therefore, the ratio of the resonance frequencies of the fundamental mode and the selected higher order mode can be an integer value or near integer value. In the present description, when the frequency ratio between the higher order mode and fundamental mode is described as being an integer value, it is understood that the "integer value" for the frequency ratio can include whole numbers or fractional numbers slightly greater than or less than the nearest whole numbers. In one embodiment, when the frequency ratio between the higher order mode and fundamental mode is described as being an integer value, the frequency ratio can have values that are whole numbers or fractional numbers that are within 2.0% of the nearest whole numbers.

In practical application, the cantilever is usually driven at a driving frequency slightly below the fundamental resonance frequency but still be within the resonance peak. This is done to improve the stability of tapping mode operation. Therefore, it is generally more desirable to have the ratios of the resonance frequencies slightly below an integer value. For example, if the 10th harmonic is to be matched with a resonance of the cantilever it is better to have the ratio of the resonance frequency of the particular mode to be tuned to the fundamental mode somewhere between 9.95 and 10.0. In this manner, the cantilever can be driven at a frequency slightly below the fundamental frequency whose 10th harmonic matches with the higher order resonance frequency.

Alternately, the cantilever can be driven at a driving frequency slightly above the fundamental resonance frequency but still be within the resonance peak. Such a condition on the drive frequency increases the influence of the attractive forces between the tip and the sample. This way, it is possible to avoid repulsive tip-sample forces which might be destructive to soft and delicate samples. In order to obtain resonant enhancement of a higher harmonic under this condition, the ratios of a higher order resonance frequency and the fundamental frequency has to be slightly above the integer ratio.

According to yet another aspect of the present invention, a cantilever for use in an atomic force microscope suppresses unwanted harmonic generation to improve resolution. The cantilever suppresses unwanted harmonic generation by placing the probe tip near the location of a node of the unwanted harmonic so that resonance of that harmonic will not be excited, as will be described in more detail below.

According to yet another aspect of the present invention, a cantilever for use in an atomic force microscope detects tip sample engagement by monitoring the amplitude of the higher harmonics signals. Rapid detection of tip-sample contact can be made, as will be described in more detail below.

TM-AFM Operational Theory

Figure 3A:
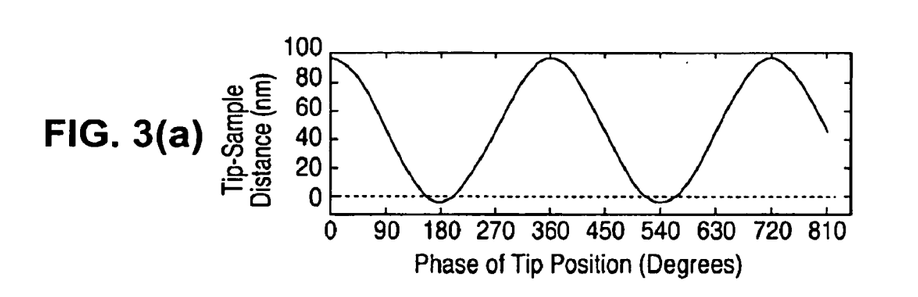
Figure 3B:
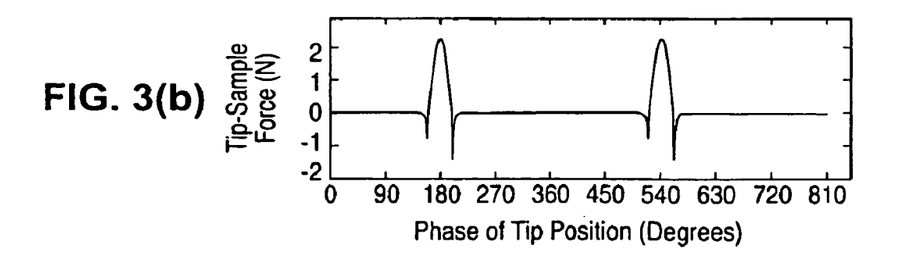
Figure 4A:
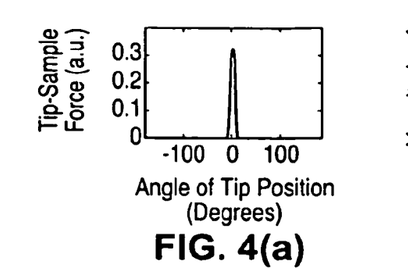
FIG. 4 plots the magnitudes of the tip sample interaction forces and the corresponding Fourier spectrum of forces for 4% FIGS. 4(a) and (d)), 8% FIGS. 4(b) and (e)), and 12% FIGS. 4(c) and (f)) contact times.
Figure 4B:
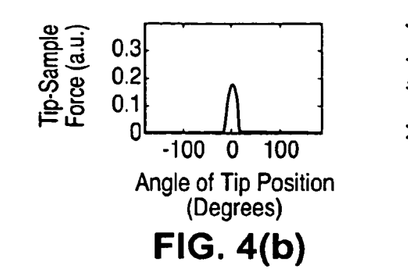
Figure 4C:
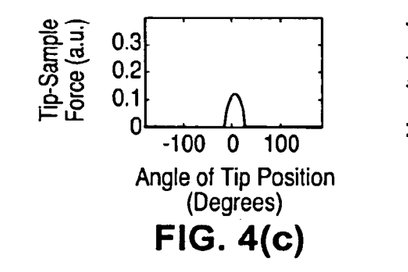
Figure 4D:
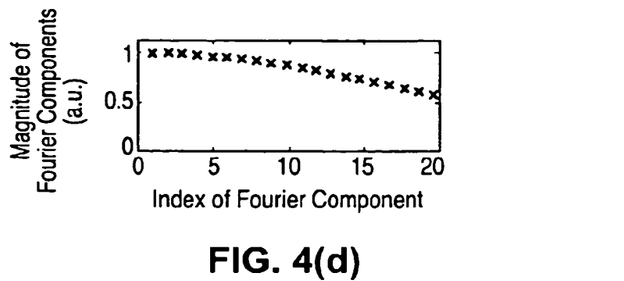
Figure 4E:
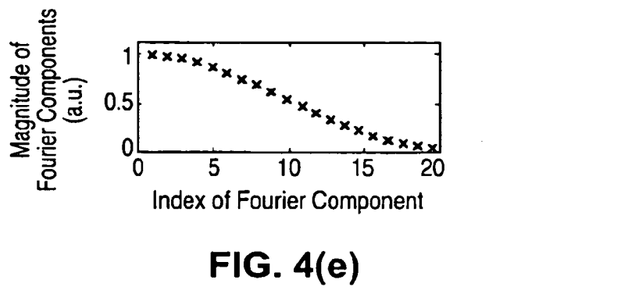
Figure 4F:
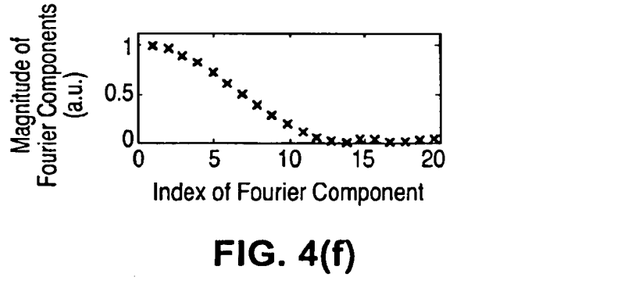

In TM-AFM, the cantilever is vibrated at its fundamental resonance frequency with sufficiently large amplitudes (10–100 nm) to avoid sticking to the sample surface. The distance between the sample surface and the rest position of the tip is kept shorter than the free vibration amplitude so that tip hits the surface once every period. Therefore, the amplitude of the cantilever vibration is reduced to the tip-sample separation. The duration of the intermittent contacts can be as long as 15% of the oscillation period, depending on the hardness of the sample. On softer samples, the tip can indent the sample surface more and spend more time in contact. Other than the repulsive forces that appear when the tip indents the surface, there are also attractive forces between the tip and the sample. The origins of these attractive forces are mainly the capillary forces and Van der Waals forces. They appear when the tip gets closer to the surface. An illustration of the interaction forces and tip displacement is given in FIG. 3. The tip position with respect to sample surface (dashed line) is shown in FIG. 3(a). Negative tip displacement means that tip indents the sample surface. FIG. 3(b) illustrates the tip-sample interaction forces. In general, the attractive forces are higher when the tip retracts. This is either due to a hysteresis in Van der Waals forces or due to formation and disruption of a liquid neck.

The periodic nature of tip-sample forces results in higher order Fourier components (harmonics) which have frequencies exactly at the integer multiples of the vibration frequency of the cantilever. The magnitudes of these harmonics mainly depend on the contact time and peak force. For illustrative purposes, the sample is modeled as a linear spring and the attractive forces were neglected. Then, the interaction forces become a clipped sine wave. FIG. 4 plots the magnitudes of the tip sample interaction forces and the corresponding Fourier spectrum of forces for 4% FIGS. 4(a) and (d)), 8% FIGS. 4(b) and (e)), and 12% FIGS. 4(c) and (f) contact times. The three different contact times, 4%, 8% and 12% correspond to hard medium and soft samples. In order to compare the three different cases, it is assumed that the average force (0th order Fourier component) is same in all of them. Then, the magnitudes of the harmonics are normalized to the 0th order Fourier component. The plots in FIG. 4 show that the higher order components, especially the ones around 15th harmonic, depend highly on the contact time. Therefore, one can argue that in TM-AFM the information about the sample elasticity is in the higher harmonics of the tip sample interaction forces.

Figure 5:
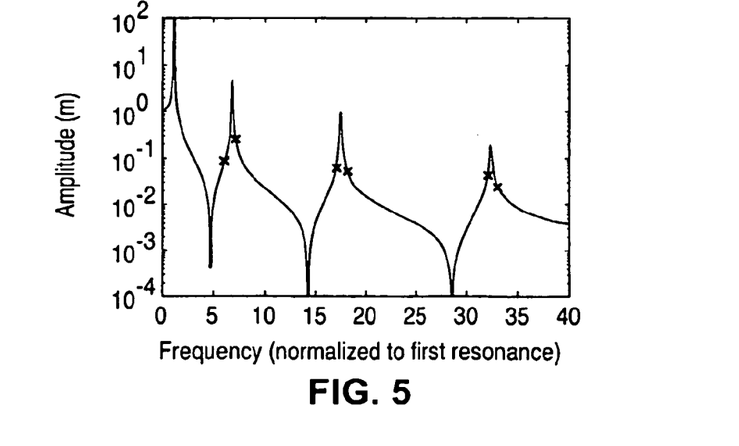
FIG. 5 is the transfer function of a typical AFM rectangular cantilever whose fundamental resonance frequency is normalized to 1.

The higher harmonics are all driven by the forces acting on the cantilever tip. The actual cantilever displacements at these frequencies therefore depend on the transfer function of the cantilever relating displacement to the tip force. That is, the higher harmonic forces, which have frequencies close to resonances of the cantilever, will generate larger vibration amplitudes. FIG. 5 is the transfer function of a typical AFM rectangular cantilever whose fundamental resonance frequency is normalized to 1. The higher harmonics that are closest to the resonance peaks are marked with cross marks on the curve. Typical quality factors of each resonance are on the order of several hundreds. Since the resonances of the cantilever are very sharp, only the harmonics that are close enough to the resonance frequency can excite that resonance. Normally the resonance frequencies of commercially available cantilevers are arbitrary and the frequencies of the higher harmonic forces are not close to the resonance frequencies of the cantilever. Therefore, the higher order resonances of the cantilever are not efficiently excited.

Harmonic Cantilever

In accordance with principles of the present invention, a micromachined harmonic cantilever mechanically amplifies signals at higher harmonics so that the higher harmonics signals can be used to reconstruct the tip-sample interaction forces. The harmonic cantilever of the present invention has been demonstrated to be capable of amplifying the signals at higher harmonics about 10–20 dB. Thus, the harmonic cantilever of the present invention can be used to image elastic properties of materials. Specifically, the harmonic cantilever of the present invention enables practical and non-destructive measurement of elasticity on both soft and hard samples with a good accuracy by enhancing the nonlinear energy transfer to higher harmonics in TM-AFM. Furthermore, the harmonic cantilever of the present invention has been demonstrated to enable detection of stiffness variations of less than 1% which represents a marked improvement over traditional TM-AFM using conventional cantilevers.

According to one embodiment of the present invention, a harmonic cantilever for use in a TM-AFM is shaped to tune the ratio of the fundamental resonance frequency and a selected higher-order resonance frequency to an integer value or near integer value, such as within 2.0% of the nearest integer value. Tuning the frequency ratio can be accomplished by tuning the fundamental resonance frequency or tuning the selected higher-order resonance frequency so that the two frequencies have an integer ratio or near integer ratio. In one embodiment, the harmonic cantilever is provided with a specific shape to tune the fundamental resonance frequency to be an integer divisible of the resonance frequency of the selected higher order mode. In another embodiment, the harmonic cantilever incorporates one or more geometric features to tune the resonance frequency of the fundamental mode or the higher-order mode of the cantilever. The resonance frequency of the selected higher order mode is tuned to match an integer multiple of the fundamental resonance frequency of the cantilever. In this manner, the vibration amplitude at higher harmonics is increased and the signals at the higher harmonics can be advantageously employed for detecting material properties of the sample under test.

In TM-AFM, the time that the tip remains in contact with the sample is typically 5–10% of the main period. This time corresponds to the periods of $10^{th}$ to $20^{th}$ harmonics of the driving frequency which is the fundamental resonance frequency of the cantilever. Higher harmonics which have resonance frequencies in this range are very sensitive to the tip sample interaction forces. The third resonance mode of the cantilever, which has a resonance frequency around $15f_0$–$20f_0$, is therefore very suitable for imaging. In one embodiment, a harmonic cantilever includes geometric features so that a third order flexural resonance frequency is matched to the 16th harmonic of the fundamental resonance frequency. Because the 16th harmonic is very sensitive to contact time variations, as illustrated in FIG. 4, such a harmonic cantilever can be used to derive information about sample elasticity and to provide such information at higher resolution than it is possible with conventional AFM cantilevers.

Two fundamental quantities that determine the resonance frequency are the effective mass and the effective spring constant of the cantilever. In accordance with the present invention, geometric features, in the form of mass modifiers, are applied to either change the effective mass or change the effective spring constant of the cantilever. By appropriately removing mass from or adding mass to regions where the cantilever has high mechanical bending stress in a specific harmonic mode (fundamental or higher order), the resonance frequency of that mode can be tuned. For instance, the resonance frequency of a higher order mode can be tuned to be an integer multiple of the fundamental resonance frequency by introducing geometric features. More specifically, when a cantilever is vibrated at one of its higher order modes, the points where the curvature of the mode shape is a maximum or where the displacement is at a maximum are the points of stress accumulation. The geometric features are thus applied to locations of stress accumulation to modify the effective mass and/or the effective spring constant of the cantilever in order to tune the resonance frequency of the higher order modes. Of course, the geometric features can also be applied to locations of stress accumulation of the fundamental mode to tune the fundamental resonance frequency.

Figure 6:
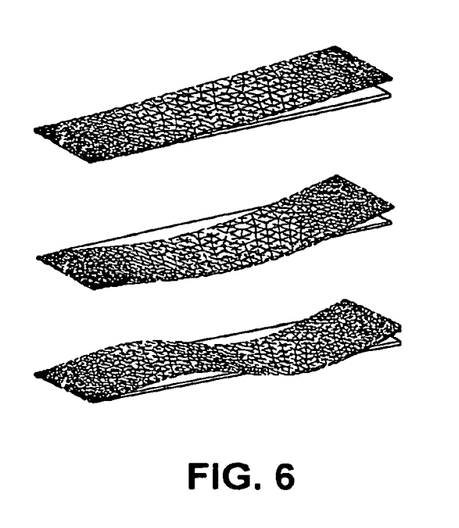
FIG. 6 illustrates the mode shapes of the 1st, 2nd, and 3rd modes of the conventional rectangular cantilever of FIG. 2.

The vibrating cantilever can be described by a harmonic model where a point mass attached to an elastic spring is driven at or near one of the resonance frequencies. FIG. 6 illustrates the mode shapes of the 1st, 2nd, and 3rd modes of the conventional rectangular cantilever of FIG. 2. The resonance frequencies of the second and third order modes are located at $6.4f_0$, and $17.6\ f_0$, where $f_0$ is the first resonance frequency. To obtain efficient excitation, the resonance frequencies should be in the ranges of $6\pm0.01$ and $17\pm0.02$ times the fundamental resonance frequency.

Figure 7:
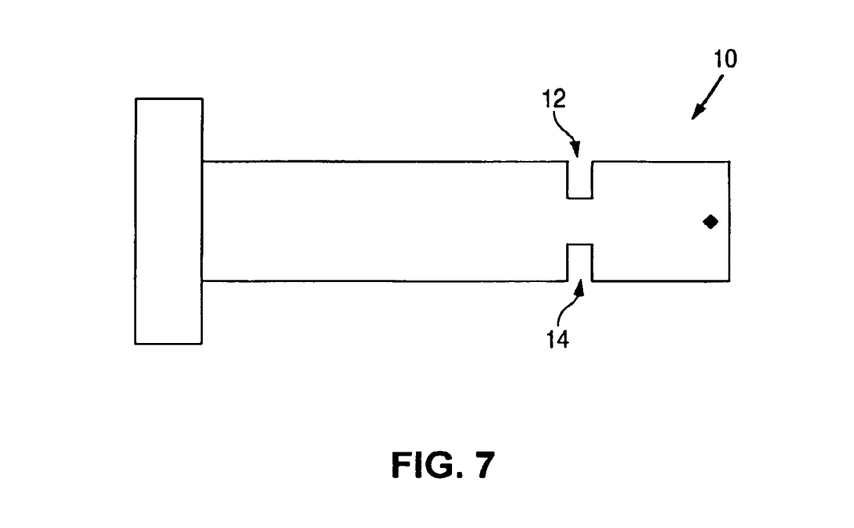
FIG. 7 illustrates a harmonic cantilever according to one embodiment of the present invention.

FIG. 7 illustrates a harmonic cantilever according to one embodiment of the present invention. Referring to FIG. 7, a harmonic cantilever 10 is a rectangular cantilever and includes a first geometric feature 12 and a second geometric feature 14 in the form of mass removal regions. Geometric features 12 and 14 are formed as notches along the sides of the cantilever arm. The geometric features operate to reduce the width of the cantilever arm at a given location. Specifically, first and second geometric features 12, 14 are located at the highly curved region of the third mode of the rectangular cantilever. In one embodiment, the first and second geometric features are located approximately ⅓ of the total length away from the free end of the cantilever. The amount of mass removal can be determined by simulation, such as by use of numerical analysis to determine the harmonics and the resonance frequencies of the cantilever. The width reduction provided by mass modifications 12 and 14 changes the effective spring constant and effective mass of the cantilever and thereby reduces the elastic energy and the resonance frequency of the third mode of cantilever 10.

Figure 8:
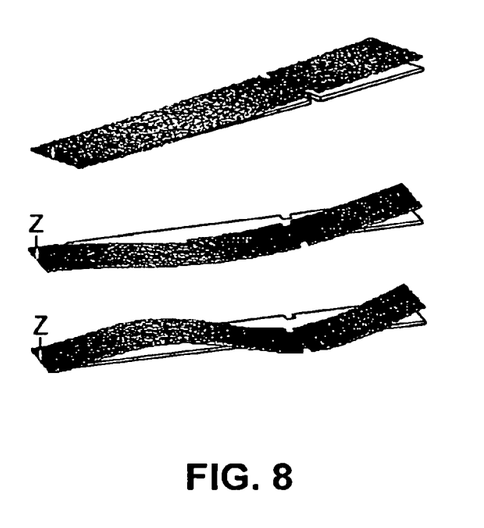
FIG. 8 illustrates the first three flexural mode shapes of the harmonic cantilever of FIG. 7.

FIG. 8 illustrates the first three flexural mode shapes of harmonic cantilever 10 of FIG. 7. As can be observed from FIG. 8, first and second geometric features 12, 14 are located at one of the curved regions of the third mode. The location does not correspond to a highly curved region in the first two modes. Therefore, the effect of the mass modification in reducing the elastic energy is more prominent in the third mode than in the first and second modes. Since removal of mass changes the mass distribution of the cantilever, the removal of mass also affects the kinetic energies or the effective mass in each mode. In the present embodiment, when the mass is removed from the curved region of the third flexural mode as shown in FIG. 7, variations in the elastic energy are more significant than in kinetic energy. This is because at the location of the mass modification, both the first and the third modes have similar displacements. However, the curvature in the third mode at that location is much higher than the curvature in the first mode. The second mode is minimally affected because the location of the mass modification is close to a node of the second mode where the curvature and the displacement are both small. In one embodiment, harmonic cantilever 10 has a resonance frequency of the third order mode at $17.002f_0$ which is closer than what is required for successful excitation of the third mode.

In sum, the elastic energy corresponds to the effective spring constant of a mode while the kinetic energy corresponds to the effective mass of a mode. When the mass at a highly curved region of the cantilever for a particular mode is modified, the elastic energy and thus the effective spring constant are modified. When the mass at a large displacement region of the cantilever for a particular mode is modified, the kinetic energy and thus the effective mass are modified. The effective mass or the effective spring constant can be individually or jointly modified in order to tune the resonance frequency of a specific high order mode. It is important to note that a change in the effective mass of the cantilever, such as by reducing the width as certain locations, also affects the effective spring constant. Therefore, locations where the geometric features are placed should be selected with consideration for changes in the effective mass and/or the effective spring constant.

Furthermore, when a geometric feature is applied to remove mass at a highly curved region of a fundamental or higher order mode of the cantilever, the resonance frequency for that mode is reduced. When a geometric feature is applied to remove mass at a high displacement region of a fundamental or higher order mode of the cantilever, the resonance frequency for that mode is increased. When a geometric feature is applied to add mass to a highly curved region of a fundamental or higher order mode of the cantilever, the resonance frequency for that mode is increased. When a geometric feature is applied to add mass to a high displacement region of a fundamental or higher order mode of the cantilever, the resonance frequency for that mode is reduced.

By applying the appropriate geometric features, the harmonic cantilever of the present invention matches the higher order resonance frequencies to integer multiples of the fundamental resonance frequency. Thus, the harmonics generated during the tip-sample contact will efficiently excite the corresponding resonance.

Figures 9, 10D, 10G:
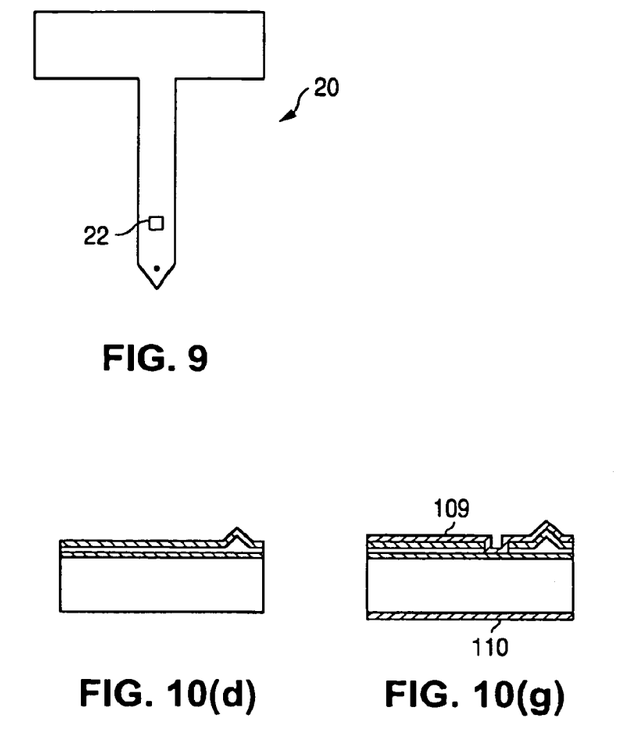
FIG. 9 illustrates a harmonic cantilever according to another embodiment of the present invention.
FIGS. 10(a) to 10(i), illustrates the process steps for forming the harmonic cantilever of FIG. 9 according to one embodiment of the present invention.

FIG. 9 illustrates a harmonic cantilever according to another embodiment of the present invention. Referring to FIG. 9, harmonic cantilever 20 includes a geometric feature 22 in the form of a mass removal region. Geometric feature 22 is formed in the shape of an opening in the body of the cantilever arm. In the present embodiment, opening 22 is placed at a highly curved region of the third flexural mode of the cantilever. In one embodiment, opening 22 is located approximately ⅓ of the total length away from the free end of the cantilever. Geometric feature 22 (or opening 22) operates in the same manner as notch geometric features 12, 14 of cantilever 10 of FIG. 7. That is, by removing mass using opening 22, the elastic energy at a highly curved region of the third mode is reduced, thus the effective spring constant of the third mode is also reduced. Opening 22 also serves to modify the kinetic energy by reducing the effective mass for the third mode. The use of opening 22 as a geometric feature enables cantilever 20 to be more stable in terms of torsional vibrations.

In one embodiment, harmonic cantilever 20 has a width of 50 um, a length of 300 um and a thickness of 2.2 um. The rectangular opening is 22 by 18 um and centered 190 um away from the cantilever base.

FIG. 10, which includes FIGS. 10(a) to 10(i) illustrates the process steps for forming harmonic cantilever 20 of FIG. 9 according to one embodiment of the present invention. In the present embodiment, the fabrication process of harmonic cantilever 20 is a three-mask process.

Figure 10A:
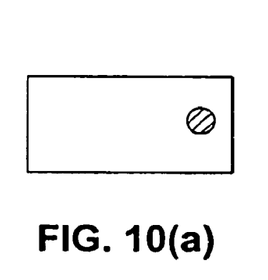
Figure 10B:
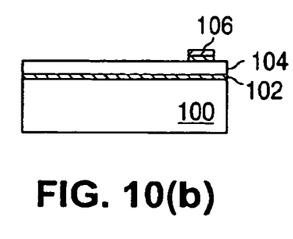
Figure 10C:
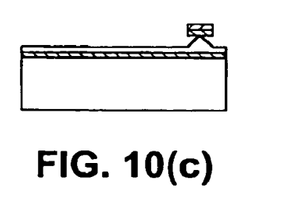

Referring to FIG. 10, the cantilever is formed on an SOI wafer including a base silicon layer 100, an oxide layer 102 and a device layer 104 (FIG. 10(b)). The device layer can be a silicon layer or a silicon nitride layer. Then, a tip mask is applied to the SOI wafer to define an area where the probe tip of the cantilever is to be formed (FIGS. 10(a) and (b)). The tip mask pattern is applied to an oxide/nitride hard mask 106 formed on device layer 104. The wafer structure is subjected to a plasma etch (FIG. 10(c)) to form the probe tip. The probe tip is subsequently oxide sharpened (FIG. 10(d)).

Figure 10E:
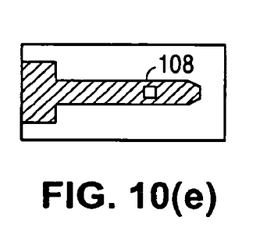
Figure 10F:
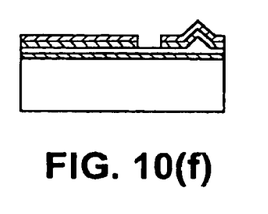
Figure 10H:
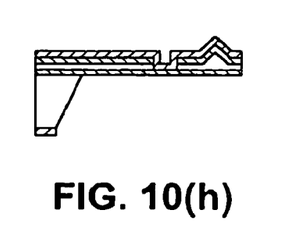
Figure 10I:
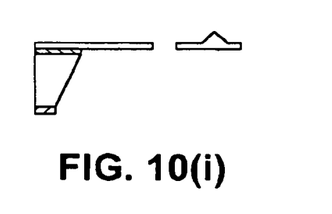

A second mask is applied to define the cantilever geometry (FIG. 10(e)). In the present embodiment, the second mask defines opening 22 to be formed in the body of the cantilever arm. The cantilever pattern is transferred to an oxide/nitride mask 108 by plasma etch and buffered oxide etch. Then, the cantilever is formed by plasma etching device layer 104 (FIG. 10(f)). The front and back side of the wafer is then covered with nitride layers 109 and 110, respectively (FIG. 10(g)). The wafer back side is patterned using a third mask and a KOH etch (insert FIG. 10)). After etching through the wafer, the cantilever is released by removing the protective top-side nitride layer 109 using plasma etching and removing the oxide in a buffered oxide etch (FIG. 10(i)).

In one embodiment, the probe tip can be coated with a diamond coating material and diamond-like carbon coating material.

Experimental Results

Experiments using harmonic cantilever 20 of FIG. 9 were performed using a commercial AFM system (Dimension 3100, Nanoscope III, Veeco, Santa Barbara, Calif.) equipped with an external RF lock-in amplifier (SR844). An external lock-in amplifier is used to detect the signals at the 16th harmonic of the driving frequency. Additionally, a spectrum analyzer is used to monitor the vibration spectrum of the cantilever.

Figure 11:
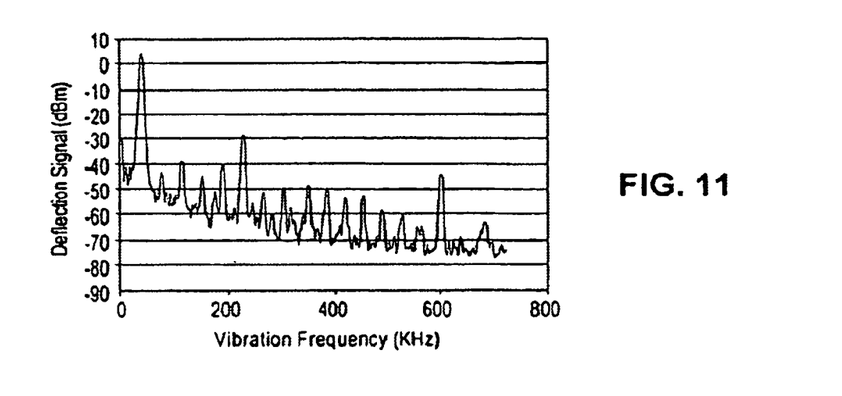
FIG. 11 is the vibration spectrum of the harmonic cantilever of FIG. 9 in tapping-mode AFM.

FIG. 11 is the vibration spectrum of the harmonic cantilever of FIG. 9 in tapping-mode AFM. The cantilever is driven at its fundamental resonance frequency (37.4 KHz), and higher-harmonics generation is observed. The 6th (240 KHz) and 16th (598 KHz) harmonics coincides with higher resonance frequencies of the harmonic cantilever and thus have relatively large signal power. In particular, the $16^{th}$ harmonic has relatively higher signal level compared to its neighbors. That is because the frequency of that particular harmonic matches the third resonance frequency of the harmonic cantilever.

Figure 12A:
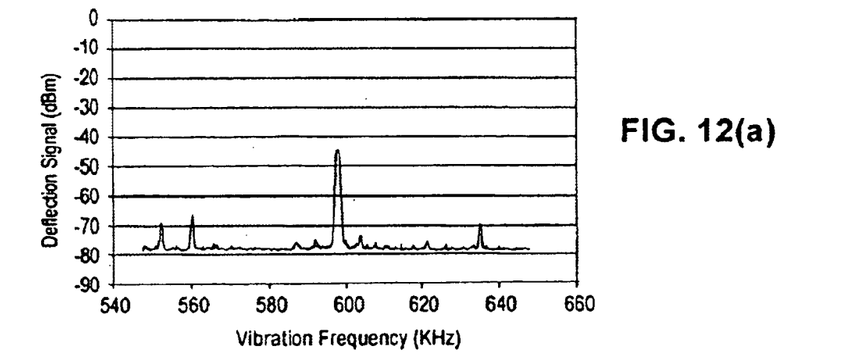
FIGS. 12(a) and 12(b), illustrates the spectra of the vibrations of the harmonic cantilever around the 15–17$^{th}$ harmonics of the driving frequency in tapping-mode atomic force microscopy.
Figure 12B:
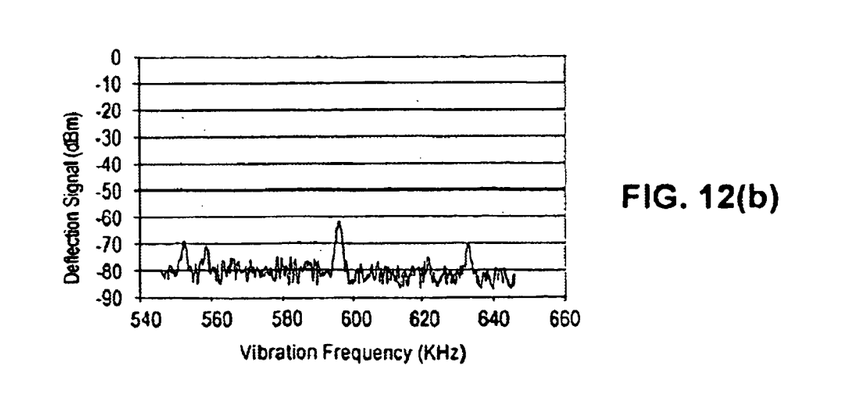

FIG. 12, including FIGS. 12(a) and 12(b), is the spectrum of the vibrations of the harmonic cantilever around the 15–17$^{th}$ harmonics of the driving frequency in tapping-mode atomic force microscopy. In FIG. 12(a), the $16^{th}$ harmonic is exactly equal to the third resonance frequency of the cantilever, recorded at 300 Hz bandwidth. In FIG. 12(b), the $16^{th}$ harmonic is slightly less than the third resonance frequency (596 KHz instead of 598 KHz), recorded at 1 KHz bandwidth.

In FIG. 12, the spectrum around the 15$^{th}$ to 17$^{th}$ harmonics is given when third resonance frequency is exactly equal to 16 times the driving frequency (FIG. 12(a)) and when there is a slight mismatch (FIG. 12(b)). By comparison of the signal strength at 16th harmonics of the signal in FIG. 12(a) and the signal in FIG. 12(b), it can be observed when the harmonic cantilever has a higher order resonance frequency that matches the integer multiple of the driving frequency, the harmonic cantilever can improve the higher-harmonic signal by 15–20 dB.

ALTERNATE EMBODIMENTS

FIGS. 7 and 9 illustrate two embodiments of the harmonic cantilevers of the present invention. The use of notches and a square opening for the geometric features is illustrative only. The geometric features, in the form of mass modifiers, can take numerous other forms for the purpose of changing the geometry of the harmonic cantilever in order to achieve the desired resonance frequency for the specific high order mode. FIGS. 13–19 illustrate harmonic cantilevers incorporating different forms of geometric features according to alternate embodiments of the present invention.

Figure 13:
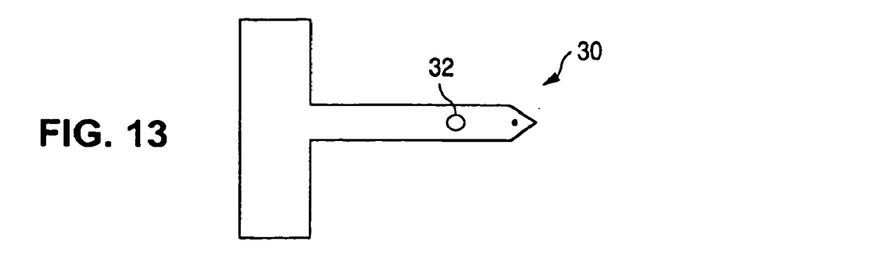
FIGS. 13–19 illustrate harmonic cantilevers incorporating different forms of geometric features according to alternate embodiments of the present invention.

First, the geometric features used to alter the geometry of the cantilever for tuning the resonance frequency can assume any shape. Referring to FIG. 13, harmonic cantilever 30 includes a geometric feature 32, as a mass removal region, formed in the shape of a circle for removing a desired amount of mass from the body of the cantilever arm. Other shapes, such as a rectangle or a pentagon, can also be used. The specific shape of the mass removal region is not critical to the practice of the present invention. In fact, any shape can be used to facilitate the removal of the desired amount of mass.

Figure 14:
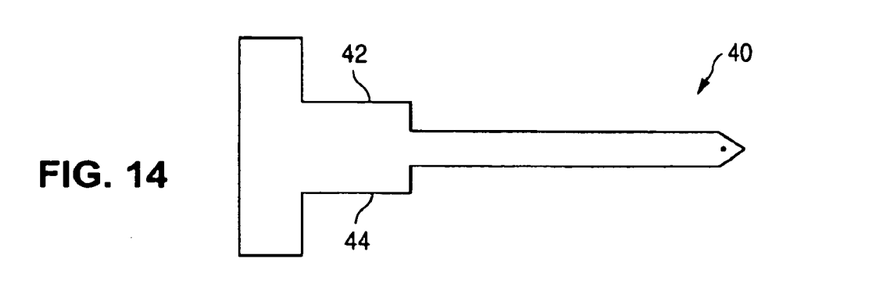

Second, the geometric features can be formed as a mass addition region for adding mass to the harmonic cantilever for the purpose of tuning the resonance frequency. The geometric features for adding mass can assume any shape. Referring to FIG. 14, harmonic cantilever 40 includes geometric features 42 and 44 positioned near the base of the cantilever arm as mass additional region. Geometric features 42 and 44 introduce mass to the fixed end of the cantilever end and have the effect of altering the effective spring constant of the cantilever. Alternately, the geometric features can be added along the body of the cantilever arm, as illustrated by harmonic cantilever 50 of FIG. 15. For instance, geometric features 52 and 54 in harmonic cantilever 50 can be located at a high curved point of the third mode of the cantilever.

Figure 15:
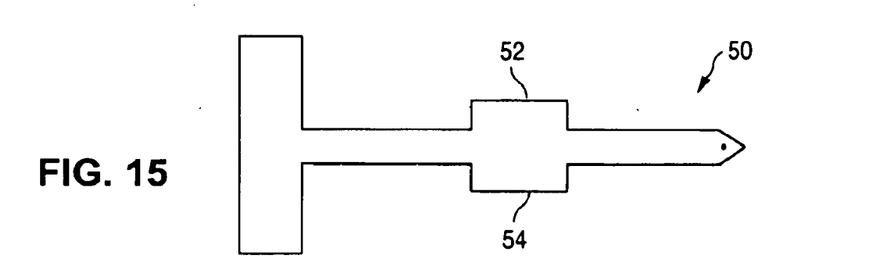
Figure 16:
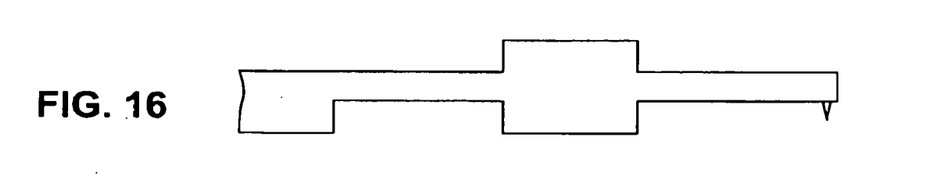
Figure 19:
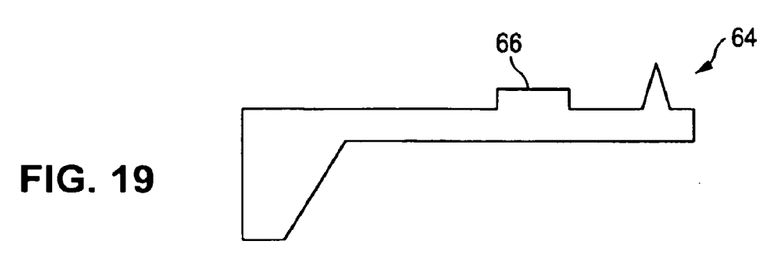

In the embodiments shown in FIGS. 14 and 15, the geometric features for adding mass to the cantilever are configured in a plane parallel to the cantilever body. Thus, the width of the cantilever is enlarged at certain regions. In other embodiments, the geometric features for adding mass can also be configured in a plane perpendicular to the cantilever body, as shown in FIG. 16. In this configuration, the thickness of the cantilever is increased at certain regions. Alternately, as shown in FIG. 19, the geometric feature can be formed as a mass addition region 66 for adding mass to the cantilever arm on the same plane as the probe tip.

Figure 17:
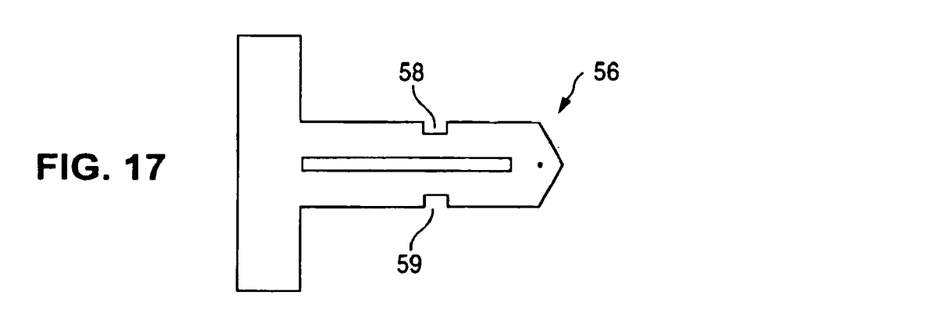
Figure 18:
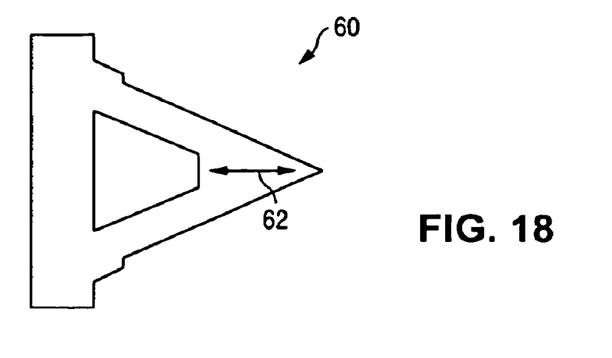

In the above descriptions, the harmonic cantilevers of the present invention have been shown as a rectangular cantilever. The use of a rectangular cantilever is illustrative only. The harmonic cantilever of the present invention can be formed as other types of harmonic cantilever, such as a V-shaped cantilever. FIG. 17 illustrates a harmonic cantilever according to another embodiment of the present invention. Referring to FIG. 17, a harmonic cantilever 56 is formed by two parallel cantilever arms. Geometric features 58 and 59 as mass removal regions are applied to the respective cantilever arms to tune the resonance frequency of a selected higher-order mode to an integer multiple of the fundamental resonance frequency. FIG. 18 illustrates a harmonic cantilever according to yet another embodiment of the present invention. Referring to FIG. 18, harmonic cantilever 60 is formed as a V-shaped cantilever. The probe tip for cantilever 60 is not shown in FIG. 18 but is usually located near the free end of the cantilever arm. In harmonic cantilever 60, the length of the free end region, indicated by the double-ended arrow 62, can be modified to tune the resonance frequencies of the cantilever to achieve an integer ratio of the fundamental and higher-order resonance frequencies.

According to another embodiment of the present invention, a harmonic cantilever can be designed to have a specific ratio of length (from the fixed end to the free end) to width so that the resonance frequency of a higher order mode matches the integer multiple of the fundamental resonance frequency. Specifically, because the ratio of the length to width of a cantilever determines the effective spring constant of the cantilever, a specific ratio of length to width can be selected to provide the desired resonance frequency for the desired mode.

Figure 20:
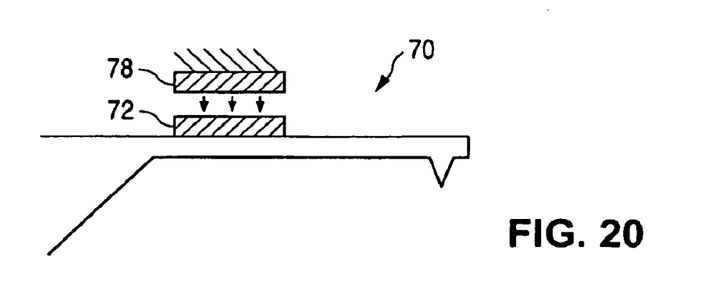
FIG. 20 illustrates a harmonic cantilever according to an alternate embodiment of the present invention.

According to another embodiment of the present invention, a harmonic cantilever incorporates an electrostatic actuator for modifying the effective spring constant of the cantilever. FIG. 20 illustrates a harmonic cantilever according to one embodiment of the present invention. Referring to FIG. 20, harmonic cantilever 70 includes an electrode 72 formed on a top surface of the cantilever body. An electrode 78 external to the cantilever is used to apply an electric field between electrodes 72 and 78 for the purpose of altering the effective spring constant of cantilever 70. FIG. 20 illustrates one configuration in which electrostatic can be used to alter the geometry and ultimately the effective spring constant of the harmonic cantilever. Other configurations of an electrostatic actuator can also be used.

Dynamic Imaging Mode

By facilitating imaging at higher harmonics, the harmonic cantilever of the present invention enables quantitative imaging of local mechanical properties. Specifically, the harmonic cantilever of the present invention can be used to realize tapping-mode atomic force microscopy for detecting a higher harmonic of the cantilever vibrations during tip-sample contact, which signals at higher harmonics carry information relating to the sample material properties, such as elasticity.

In one embodiment, a harmonic cantilever of the present invention is oscillated at or near one of its resonance frequencies. Usually, the driving frequency is the fundamental resonance frequency, that is, the resonance frequency of the lowest oscillation mode of the cantilever or slightly below the fundamental resonance frequency. The harmonic cantilever incorporates geometric features for tuning the fundamental resonance frequency or the resonance frequency of a higher order mode so that the resonance frequency of the higher order mode is an integer multiple of the fundamental resonance frequency. For instance, in the present embodiment, the third order flexural resonance frequency is matched to the 16th harmonic of the fundamental resonance frequency.

The harmonic cantilever, being driven at the driving frequency, is brought to the vicinity of the sample to create intermittent contacts with the sample while the cantilever is oscillating. During imaging, the signal to be measured is not only the amplitude and phase of the oscillations at the driving frequency but also the amplitude and phase of a higher harmonic corresponding to the higher order mode whose frequency is matched to an integer multiple of the oscillation frequency. For example, the amplitude and phase of the third order can be measured as it is matched to the 16th harmonic of the oscillation frequency. In other embodiments, if two or more of the higher order modes have integer matched resonance frequencies, then all of those signals can be used to increase the quality and accuracy of the images. The harmonic cantilever of the present invention is capable of filtering and amplifying a desired harmonic of the interaction forces between the tip and the sample to enable the effective use of the higher order responses of the cantilever when driven at the fundamental resonance frequency.

It is generally understood that phase is a relative quantity and the measurement of phase variations requires a reference signal of the same frequency. In general, the reference signal at the frequency of the resonant harmonic signal could be either a signal that is 'phase matched' to the driving signal or phase matched to the cantilever vibration at the driving frequency. Phase matched means that if one signal has a frequency that is an integer multiple of the other, once in every period of the low frequency signal, the two signals have the same angle. For example, for two signals $\cos(t)$ and $\cos(15t+\theta)$ that are phase matched, at $t=0, 2\pi, 4\pi, 6\pi$, and so on, one signal is always equal to 1 and the other signal is always equal to $\cos(\theta)$. But between these times, the low frequency signal makes one cycle and the high frequency signal makes 15 cycles.

In one application, the amplitude or phase measured at high frequency can be used in a feedback loop so that the amplitude or phase of the harmonic cantilever is constant during the scan. Based on the amplitude or phase measured, the feedback loop either adjusts the driving voltage (free amplitude) or tip-sample equilibrium separation (set-point amplitude) to keep the phase or amplitude constant.

Suppression of Harmonic Generation

In dynamic atomic force microscopy, tip sample interaction results in generation of harmonics of the tip vibration. Although this can be useful for measuring material properties and obtaining better images with higher-harmonics, some of the harmonics can pose problems to the stable motion of the cantilever. For example, when the probe tip hits strongly to a surface in tapping-mode, the harmonics around the second resonance of the cantilever are excited.

Figure 21:
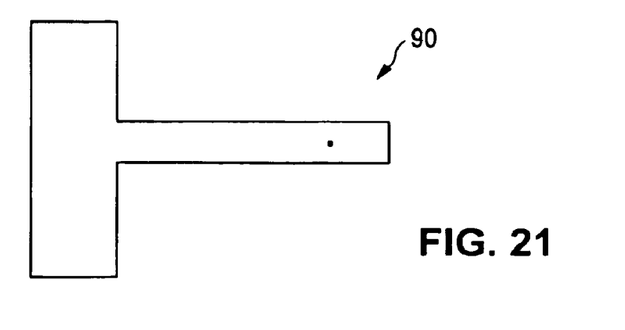
FIG. 21 illustrates a cantilever where the probe tip is placed at a location operative for suppressing the unwanted second resonance mode.

According to on aspect of the present invention, a cantilever for use in a TM-AFM is configured to suppress unwanted harmonics while preserving useful harmonics. Specifically, the probe tip is placed at a location where the unwanted harmonics has minimum displacement. In one embodiment, the probe tip is placed close to the node of the unwanted harmonics, such as the second resonance mode shape. FIG. 21 illustrate a cantilever where the probe tip is placed at a location operative for suppressing the unwanted second resonance mode. By placing the probe tip at a location where the second harmonic has minimum displacement, the unwanted harmonics will not be excited by the cantilever vibration. However, other modes that do not have a node at the probe tip location will be excited. In this manner, higher forces can be applied to the surface without disturbing the periodic and stable cantilever motion.

Using High Harmonic Signals as Amplitude Feedback

According to another aspect of the present invention, a method for providing precision amplitude control of a cantilever in a TM-AFM is disclosed. In one embodiment, the harmonic cantilever of the present invention, having the ratio of the fundamental frequency and a higher order resonance frequency tuned to an integer value, is used in a TM-AFM for providing an amplitude feedback signal. The harmonic cantilever is driven at or near the fundamental resonance frequency and the signals at higher order harmonics are measured as a feedback signal to control the amplitude of the harmonic cantilever relative to the sample being tested. Because the higher harmonic signals are of higher frequencies, the higher harmonic signals are more sensitive to surface topology changes and a faster response in amplitude adjustment can be realized. By using the harmonic cantilever of the present invention and the amplified higher harmonic signals derived therefrom for amplitude adjustment, more precision surface topology measurement can be achieved. For example, sharp edge and large surface variations can be readily and precisely detected.

Detecting Tip-Sample Engagement

According to another aspect of the present invention, a method for operating a cantilever in a TM-AFM for improved detection of the tip-sample contact is disclosed. As is well known in the art, a major difficulty with operating an AFM instrument is bringing the cantilever to the vicinity of the sample surface. It is often very difficult to detect if the cantilever is brought too close to the sample surface. In accordance with a method of the present invention, the higher harmonics of the cantilever motion is monitored as the cantilever is brought near the sample surface. When the tip of the cantilever hits the sample surface, higher harmonic vibrations appear. The higher harmonic vibration signals are used advantageously to enable rapid detection of the occurrence of tip-sample engagement.

In one embodiment, the cantilever arm of a cantilever is lowered to the sample surface while the amplitude of the cantilever vibrations at a higher harmonic of the driving frequency is measured. The cantilever arm is lowered until an increase in the amplitude of the higher harmonic vibrations is detected. In this manner, rapid and precise detection of tip-sample engagement is achieved.

The higher harmonic used for the detection of the tip-sample engagement can be chosen such that the selected harmonic is close to a resonance frequency of the cantilever. The cantilever can be any conventional cantilevers. In one embodiment, the cantilever is a harmonic cantilever of the present invention described above. In this case, the selected higher harmonic can be at a resonance frequency that is integer matched to the fundamental resonance frequency.

The above detailed descriptions are provided to illustrate specific embodiments of the present invention and are not intended to be limiting. Numerous modifications and variations within the scope of the present invention are possible. The present invention is defined by the appended claims.

We claim:

1. A cantilever for use in an atomic force microscope, the cantilever comprising:

a cantilever arm having a fixed end and a free end, the cantilever arm having a fundamental resonance frequency and at least one higher order resonance frequency; and a probe tip projecting from the cantilever arm near the free end, wherein the cantilever is to be used in an atomic force microscope and the cantilever arm has a shape selected to tune the fundamental resonance frequency of the fundamental mode or a resonance frequency of a selected higher order mode so that the resonance frequency of the selected higher order mode and the fundamental resonance frequency has an integer ratio.

2. The cantilever of claim 1, wherein the integer ratio comprises whole numbers and fractional numbers slightly greater than or less than the nearest whole numbers so that when the cantilever is driven at a driving frequency at or slightly below or slightly above the fundamental resonance frequency, the resonance frequency of the selected higher order mode is an integer multiple of the driving frequency.

3. The cantilever of claim 2, wherein the integer ratio comprises whole numbers and fractional numbers within 2.0% of the nearest whole numbers.

4. The cantilever of claim 1, wherein the free end of the cantilever arm has a second shape selected to tune the fundamental resonance frequency of the cantilever to a value that is integer divisible of the resonance frequency of the selected higher order mode.

5. The cantilever of claim 4, wherein the second shape comprises tapered sides forming the free end of the cantilever arm.

6. The cantilever of claim 1, wherein the cantilever arm comprises a first geometric feature disposed at a predefined location of the cantilever arm, the first geometric feature operating to modify the mass of the cantilever arm at the predefined location to tune the fundamental resonance frequency or the resonance frequency of the selected higher order mode of the cantilever so that the fundamental resonance frequency and the resonance frequency of the selected higher order mode has an integer ratio.

7. The cantilever of claim 6, wherein the first geometric feature operates to reduce the effective width of the cantilever arm at the predefined location.

8. The cantilever of claim 6, wherein the first geometric feature operates to increase the effective width of the cantilever arm at the predefined location.

9. The cantilever of claim 6, wherein the first geometric feature operates to reduce the thickness of the cantilever arm at the predefined location.

10. The cantilever of claim 6, wherein the first geometric feature operates to increase the thickness of the cantilever arm at the predefined location.

11. The cantilever of claim 6, wherein the first geometric feature is located at a location of high mechanical bending stress for the fundamental mode or the selected higher order mode.

12. The cantilever of claim 11, wherein the first geometric feature is located at a high curvature region of the fundamental mode or the selected higher order mode.

13. The cantilever of claim 11, wherein the first geometric feature is located at a high displacement region of the fundamental mode or the selected higher order mode.

14. The cantilever of claim 11, wherein the first geometric feature operates to alter the effective spring constant of the cantilever arm.

15. The cantilever of claim 11, wherein the first geometric feature comprises a mass removal region.

16. The cantilever of claim 15, wherein the first geometric feature operates to remove mass from a high curved region of the fundamental mode or the selected higher order mode to decrease the resonance frequency of the fundamental mode or the selected higher order mode.

17. The cantilever of claim 15, wherein the first geometric feature operates to remove mass from a high displacement region of the fundamental mode or the selected higher order mode to increase the fundamental resonance frequency or the resonance frequency of the selected higher order mode.

18. The cantilever of claim 15, wherein the mass removal region comprises a first notch and a second notch formed at a first side and an opposite second side, respectively, of the cantilever arm.

19. The cantilever of claim 15, wherein the mass removal region comprises an opening formed in the body of the cantilever arm.

20. The cantilever of claim 19, wherein the mass removal region comprises a rectangular opening or a round opening.

21. The cantilever of claim 19, wherein the selected mode is the third flexural mode of the cantilever and the mass removal region is positioned at a high curvature region of the third flexural mode.

22. The cantilever of claim 21, wherein the mass removal region is positioned at one-third of the total length away from the free end of the cantilever arm.

23. The cantilever of claim 11, wherein the first geometric feature comprises a mass addition region.

24. The cantilever of claim 23, wherein the mass addition region increases the effective width of the cantilever at the predefined location.

25. The cantilever of claim 23, wherein the mass addition region increases the thickness of the cantilever at the predefined location.

26. The cantilever of claim 23, wherein the first geometric feature operates to add mass to a high curved region of the fundamental mode or the selected higher order mode to increase the resonance frequency of the fundamental mode or the selected higher order mode.

27. The cantilever of claim 23, wherein the first geometric feature operates to add mass to a high displacement region of the fundamental mode or the selected higher order mode to decrease the fundamental resonance frequency or the resonance frequency of the selected higher order mode.

28. The cantilever of claim 1, wherein the cantilever arm comprises a material selected from the group of silicon and silicon nitride.

29. The cantilever of claim 1, wherein the probe tip is coated with a material selected from the group of diamond coating material and diamond-like carbon coating material.

30. The cantilever of claim 11, wherein the cantilever arm comprises a rectangular shaped cantilever including the first geometric feature modifying the shape and the mass of the cantilever arm.

31. The cantilever of claim 11, wherein the cantilever arm comprises a V-shaped cantilever including the first geometric feature modifying the shape and the mass of the cantilever arm.

32. The cantilever of claim 1, wherein the cantilever arm further comprises a first electrode of an electrostatic actuator where a second electrode of the electrostatic actuator is formed outside the cantilever, the electrostatic actuator operating to alter the effective spring constant of the cantilever by applying an electric field between the first and second electrodes.

* * * * *